United States Patent
Sanders et al.

(10) Patent No.: US 11,307,559 B2
(45) Date of Patent: Apr. 19, 2022

(54) GENERATION OF HOLDING TABS FOR FIXING A PART DURING MACHINING

(71) Applicant: Autodesk, Inc., San Rafael, CA (US)

(72) Inventors: Lee Sanders, Tamworth (GB); Mark Antony Millership, Pelsall (GB)

(73) Assignee: Autodesk, Inc., San Rafael, CA (US)

( * ) Notice: Subject to any disclaimer, the term of this patent is extended or adjusted under 35 U.S.C. 154(b) by 64 days.

(21) Appl. No.: 16/889,204

(22) Filed: Jun. 1, 2020

(65) Prior Publication Data

US 2021/0373528 A1 Dec. 2, 2021

(51) Int. Cl.
G05B 19/4097 (2006.01)
(52) U.S. Cl.
CPC ............ *G05B 19/4097* (2013.01); *G05B 2219/35134* (2013.01); *G05B 2219/37087* (2013.01)
(58) Field of Classification Search
CPC ................................................ G05B 19/4097
See application file for complete search history.

(56) References Cited

U.S. PATENT DOCUMENTS

| 10,556,309 B1* | 2/2020 | Jacobs, II | ................. B23C 3/10 |
| 2009/0112354 A1* | 4/2009 | El-Wardany | ............. F01D 5/34 700/160 |

OTHER PUBLICATIONS

Mike Downs, "Benefit of Using Tabs for 2D CAD-CAM Milling—BobCAD-CAM," (Jan. 8, 2020) [online] (retrieved from https://bobcad.com/using-tabs-for-2d-cad-cam-milling/), 8 pages.
Don LaCourse, "CAD/CAM Bridges and Tabs—MecSoft Corporation," (Jan. 8, 2020) [online] (retrieved from https://mecsoft.com/blog/bridges-tabs-explored/), 5 pages.
"Creating 'holding tabs' or 'bridges' forum," (Jan. 8, 2020) [online] (retrieved from https://www.cnczone.com/forums/dolphin-cadcam/267330-cnc-posts.html), 5 pages.

\* cited by examiner

*Primary Examiner* — Thomas C Lee
*Assistant Examiner* — Syed A Warsi
(74) *Attorney, Agent, or Firm* — Fish & Richardson P.C.

(57) ABSTRACT

Methods, systems, and apparatus, including medium-encoded computer program products, for computer aided design and manufacture of physical structures using subtractive manufacturing systems and techniques include, in one aspect, a method including: obtaining a toolpath specification for a three dimensional model of geometry of a part to be machined from a workpiece; calculating predicted cutting forces to be applied to the workpiece when machining the part; generating a set of holding tabs for the part based on the predicted cutting forces, wherein each of the holding tabs bridge from the part to the workpiece so as to keep the part fixed, in situ, within the workpiece during the machining, and at least one position of a holding tab from the set is determined in accordance with the predicted cutting forces; and providing the set of holding tabs for use by a computer-controlled manufacturing system.

20 Claims, 6 Drawing Sheets

GENERATION OF HOLDING TABS FOR FIXING A PART DURING MACHINING

BACKGROUND

This specification relates to computer aided design and manufacture of physical structures using subtractive manufacturing systems and techniques.

Computer Aided Design (CAD) software and Computer Aided Manufacturing (CAM) software has been developed and used to generate three-dimensional (3D) representations of parts and to manufacture the physical structures of those parts, e.g., using Computer Numerical Control (CNC) manufacturing techniques. Further, additive manufacturing, also known as solid free form fabrication or 3D printing, refers to any manufacturing process where 3D parts are built up from raw material (generally powders, liquids, suspensions, or molten solids) in a series of two-dimensional layers or cross-sections.

In addition, subtractive manufacturing refers to any manufacturing process where 3D parts are created from stock material (generally a "blank" or "workpiece" that is larger than the 3D part) by cutting away portions of the stock material. Such manufacturing processes typically involve the use of multiple CNC machine cutting tools in a series of operations, starting with a roughing operation, an optional semi-finishing operation, and a finishing operation. During roughing operation(s), large portions of the workpiece are cut away quickly (relative to semi-finishing and finishing operations) using cutting tool(s) of the CNC machining system in order to approximate the final shape of the part being manufactured.

SUMMARY

This specification describes technologies relating to computer aided design and manufacture of physical structures using subtractive manufacturing systems and techniques and producing holding tabs by assessing predicted cutting forces experienced by a workpiece during computer-controlled machining.

In general, one or more aspects of the subject matter described in this specification can be embodied in one or more methods for using holding tabs during manufacturing of a part out of a workpiece during computer-controlled machining. In a first aspect, a toolpath specification for a three dimensional model of geometry of a part is obtained to be machined by a computer-controlled manufacturing system from a workpiece. Predicted cutting forces to be applied to the workpiece when machining the part using the toolpath specification are calculated. A set of holding tabs are generated for the part based on the predicted cutting forces, wherein each of the holding tabs bridge from the part to the workpiece so as to keep the part fixed, in situ, within the workpiece during the machining of the part from the workpiece, and wherein at least one position of a holding tab from the set of holding tabs is determined in accordance with the predicted cutting forces. The set of holding tabs are provided for use during the machining of the part by the computer-controlled manufacturing system.

In a second aspect, positions of the holding tabs of the set of holding tabs and a quantity of the holding tabs may be determined in accordance with the predicted cutting forces and one or more directions of the predicted cutting forces.

In a third aspect, the holding tabs may be defined with sizes in accordance with the predicted cutting forces. The third aspect can be combined with any one of the first and the second aspect.

In a fourth aspect, a shape and an attachment angle defined for a holding tab from the set of holding tabs may be determined based on the predicted cutting forces and the one or more directions of the predicted cutting forces. The fourth aspect can be combined with any one of the first, the second, and/or the third aspect.

In a fifth aspect, generating the set of holding tabs may include generating a plurality of sets of holding tabs defining different holding tab options to keep the part fixed, in situ, within the workpiece during the machining of the part. The computer-implemented method can include receiving a user selection of one of the different holding tab options from the plurality of sets of holding tabs. In some instances, providing the set of holding tabs for use during the machining of the part may include providing the selected one of the different holding tab options as the set of holding tabs to be used when performing the machining of the part. The fifth aspect can be combined with any one of the first, the second, the third, and/or the fourth aspect.

In a sixth aspect, the computer-implemented method can include receiving input including a selection of one or more regions of the three dimensional model of geometry of the part to be excluded for placing of holding tabs. Generating the set of holding tabs can include excluding the one or more regions at the three dimensional model from regions of the part available for connection to holding tabs. The sixth aspect can be combined with any one of the first, the second, the third, the fourth, and/or the fifth aspect.

In a seventh aspect, a size of a holding tab may be defined based on a type of machining operation to be performed at an area where the holding tab is to be placed, wherein the type of machining operation is associated with a corresponding predicted cutting force to be induced on the part when performing the type of machining operation.

In some instances, generating the set of holding tabs may include defining a first sub-set of holding tabs from the set of holding tabs. The first sub-set of holding tabs may be defined by removing one or more holding tabs from the set of holding tabs. The first sub-set of holding tabs may be further defined to hold the part, in situ, in the workpiece during a semi-finishing operation of the machining to be performed after a roughing operation, and before a finishing operation, on the part from the workpiece. The seventh aspect can be combined with any one of the first, the second, the third, the fourth, the fifth, and/or the sixth aspect.

In an eight aspect, generating the set of holding tabs may include removing one or more holding tabs from the first sub-set of holding tabs to define a second sub-set of holding tabs for use when performing the finishing operation of the machining to provide a finished surface of the part. The second sub-set of holding tabs may maintain the part, in situ, within the workpiece during the finishing operation. The eight aspect can be combined with any one of the first, the second, the third, the fourth, the fifth, the sixth, and/or the seventh aspect.

Likewise, one or more aspects of the subject matter described in this specification can be embodied in one or more systems that include a data processing apparatus including at least one hardware processor and a non-transitory computer-readable medium encoding instructions of a computer-aided design or manufacturing program. The instructions being configured to cause the data processing apparatus to obtain a toolpath specification for a three dimensional model of geometry of a part to be machined by a computer-controlled manufacturing system from a workpiece and calculate predicted cutting forces to be applied to the workpiece when machining the part using the toolpath specification and generate a set of holding tabs for the part based on the predicted cutting forces, wherein each of the holding tabs bridges from the part to the workpiece so as to keep the part fixed, in situ, within the workpiece during the machining of the part from the workpiece, and wherein at least one position of a holding tab from the set of holding tabs, is determined in accordance with the predicted cutting forces, and provide the set of holding tabs for use during the machining of the part by the computer-controlled manufacturing system.

Thus, as will be appreciated, the non-transitory, computer-readable medium can encode instructions configured to cause the data processing apparatus to perform the one or more methods, as detailed above and herein. Moreover, the system can include the computer-controlled manufacturing system.

Particular embodiments of the subject matter described in this specification can be implemented to realize one or more of the following advantages. In some instances, a part is machined from a workpiece that is a block of material, and during the manufacturing process, the part is maintained inside the block material. To keep the part inside the block material in a stable and fixed position, holding tabs may be used. The holding tabs may be positioned to bridge between the part and the rest of the working piece so as to keep the part fixed, in situ, while inducing cutting forces to machine the part. Maintaining the part in a fixed position is facilitated by arranging holding tabs that extend from the part and can be provided with a different position, size, or shape, to enhance stability. The holding tabs retain the workpiece rigid enough to withstand applied force during the machining process to produce the part.

Locations of these holding tabs may be defined very subjectively if they are selected by a user (e.g., a programmer of a CNC machine) and may be dependent on the user's skill and experience. In addition, the number of holding tabs that may be defined for a given part by a user can be unnecessarily high or too low in relation to a number of holding tabs that are necessary, or warranted for the particular part to be kept fixed for a particular machining operation. Further, the size and orientation of the holding tabs may also vary and be subjectively defined.

In some instances, a user of a machine tool may be assisted when determining the holding tabs, and be provided with a set of holding tabs that is generated for the given part to be machined to improve the machining process. As the holding tabs may be generated based on predicted cutting forces that are to be applied on the workpiece when machining the part, these holding tabs may be better positioned to withhold the cutting forces and keep the part, in situ, to support the precise machining of the part.

In some instances, tabs are positioned to withstand forces, and their positions correspond to calculated predicted forces and/or the forces direction. For example, when forces are stronger, the number of tabs may be higher, or tabs may have a corresponding size, e.g., larger, or have a special form to address the stronger forces. In the case of stronger forces, e.g., when performing a roughing operation, the number of tabs may be higher compared to a case where forces are weaker, e.g., when performing a finishing operation. If positions determined for tabs are not in the right position to correspond to applied forces, for example force's location, magnitude, direction, among others, it may cause a tab to break. By positioning holding tabs to hold a part fixed, in situ, when machining, the part is kept reliably fixed to the workpiece. In such manner, the part is kept stable to withstand the forces and not to break during machining. By improving reliability of keeping the part fixed during machining with the set of holding tabs that are provided to bridge the part to the rest of the workpiece, the part may be machined with better precision and accuracy due to the improved stability.

Further, as the number of holding tabs is not randomly selected, but corresponds to necessary tabs to hold the part, in situ, that are determined based on calculations performed in relation to expected cutting forces and their direction, the part may be machined faster, and with fewer processing operations to adjust the toolpath, based on fewer restrictions provided by the defined holding tabs.

In some instances, by determining an appropriate quantity of holding tabs for a part to be manufactured, the manufacturing process will be improved as a whole, as chances of movement of the part and machining failure during the CNC machining phases can be reduced. Further, as the number of holding tabs would correspond to the specifics of the part being machined, the cutting forces and their direction, fewer tabs may be defined and there may be fewer restrictions on the machining process in general. Further, as the number of holding tabs may be optimized according to the forces, once the part is machined, the part can be separated from the rest of the workpiece, and the surface of the part may be finished by a finishing process with fewer processing steps. As the finishing process includes cutting the extending tabs from the piece, the finishing process can be associated with reduced amount of work for the holding tabs, such as reducing the amount of manual grinding or sanding in relation to the tabs. Therefore, operations related to providing a finished surface of the part at the end of the machining can be improved. Further, improved results may be achieved for the final quality of the part that is manufactured, as fewer portions of the surface of the part have to be manually finished. The part can be machined with an improved surface finish and accuracy of producing the defined geometry of the part.

In some instances, when a part is provided for machining by a computer-controlled manufacturing system, the part is defined with a toolpath specification for the machining, where the toolpath specification is generated for a three dimensional model for the part. By calculating the cutting forces that are to be applied on the workpiece to machine the part and their corresponding directions, the holding tabs may be generated based on an objective criteria and can take the guess work out of determining an appropriate set of tabs for the different operations performed over the workpiece when machining the part.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
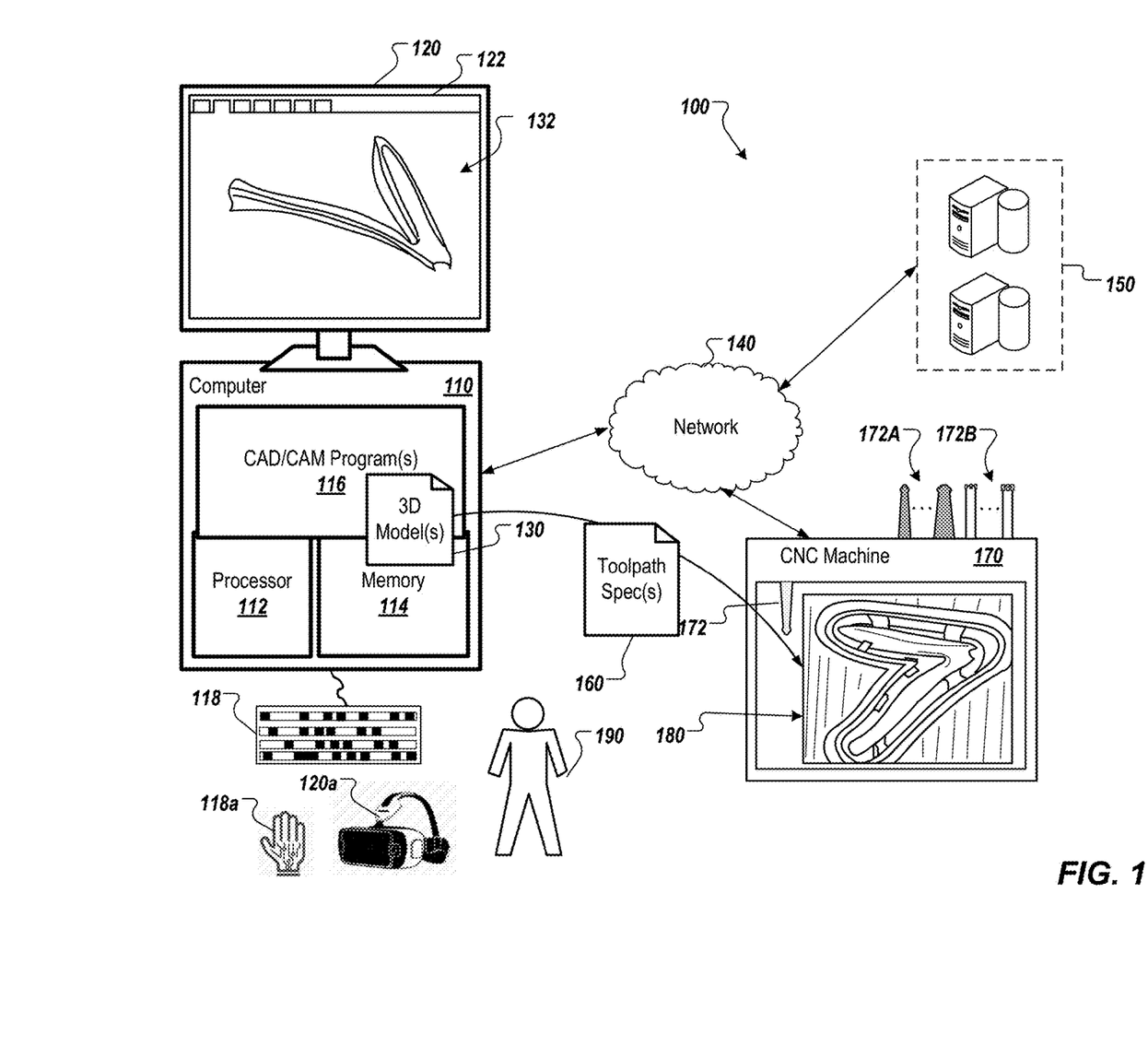
FIG. 1 shows an example of a system usable to design and manufacture physical structures.

FIG. 1 shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs include one or more three-dimensional (3D) modeling, simulation (finite element analysis or other) and manufacturing control programs such as Computer Aided Design (CAD) and/or Computer Aided Manufacturing (CAM) program(s) 116, also referred to as Computer Aided Engineering (CAE) programs, etc. The CAD/CAM Program(s) 116 may be computer programs having implemented logic for generating holding tabs when defining parts for machining out of workpieces. The program(s) 116 can run locally on computer 110, remotely on a computer of one or more remote computer systems 150, (e.g., one or more third party providers' one or more server systems accessible by the computer 110 via the network 140) or both, locally and remotely. The CAD/CAM program 116 presents a user interface (UI) 122 on a display device 120 of the computer 110, which can be operated using one or more input devices 118 of the computer 110, (e.g., keyboard and mouse). Note that while shown as separate devices in FIG. 1, the display device 120 and/or input devices 118 can also be integrated with each other and/or with the computer 110, such as in a tablet computer or in a virtual reality (VR) or augmented reality (AR) system. For example, the input/output devices 118, 120 can include a VR input glove 118a and a VR headset 120a.

A user 190 can interact with the program(s) 116 to create and/or load a 3D model 132 (e.g., from a document 130) of a part to be manufactured using a Computer Numerical Control (CNC) manufacturing machine 170, such as a multi-axis, multi-tool milling machine. This can be done using known graphical user interface tools, and the 3D model 132 can be defined in the computer using various known 3D modeling formats, such as solid models (e.g., voxels) or surface models (e.g., B-Rep (Boundary Representation (B-Rep)) and surface meshes). In addition, the user 190 can interact with the program(s) 116 to modify the 3D model 132 of the part, as needed.

In the example shown, the model 132 is a 3D model of a particular part, for example, a connector for attachment of manufactured parts into a larger system or machine. In some examples, the model 132 may be a 3D model of other parts such as a circuit board, a tool part, jewelry, among others. Many different types of models can be used with the systems and techniques described herein. Once the 3D model 132 of the part is ready to manufacture, the 3D model 132 can be prepared for manufacturing the physical structure of the part by generating toolpaths for use by the computer-controlled manufacturing system to manufacture the part. For example, the 3D model 132 can be used to generate a toolpath specification document 160, which can be sent to the CNC machine 170 and used to control operation of one or more milling tools.

This can be done upon request by the user 190, or in light of the user's request for another action, such as sending the 3D model 132 to the CNC machine 170, or other manufacturing machinery, which can be directly connected to the computer 110, or connected via a network 140, as shown. This can involve a post-process carried out on the local computer 110, or a cloud service, to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. Further, in some implementations, the computer 110 is integrated into the CNC machine 170, and so the document 160 is created by the same computer that will use the document 160 to manufacture the part 180. In some implementations, a toolpath specification document 160 can be generated that includes one or more roughing toolpaths that cause the CNC machine 170 to use one or more cutting tools 172 to perform rouging operation(s) to cut a roughed structure from a workpiece to form the part on which further operations, such as semi-finishing operation(s) and finishing operations, can be performed. When a part is machined from the workpiece, different forces with different magnitude and direction are applied. To keep the part fixed during machining, one or more holding tabs may be placed on the part to keep it stable to withstand the cutting forces. The holding tabs can be positioned at different places to keep the part fixed. As cutting forces are applied when machining the part, the holding tabs may be generated in accordance with these cutting forces, for example, their predicted magnitude, direction, term of operation, conditions, etc.

As will be appreciated, there are many different types of cutting tools 172 that may be available in the CNC machine 170 for machining a part out of a workpiece. The cutting tools can include milling cutter tools with various ball nose, tapered, tip radius and barrel geometries. By using these tools during machining, different forces are applied to machine the part. To keep the part fixed, in situ, while machining, and using one or more of the cutting tools 172, the part can be provided with holding tabs that are positioned in accordance with the expected induced cutting forces during machining. The different cutting tools 172 that can be used for machining a part can include solid tools having different diameters and tip radius (e.g., solid carbide round tools) that create different cutting surface geometries for the tools 172, and/or insert tools having different diameters and metal (e.g., carbide) inserts that create different cutting surface geometries for the tools 172. These different tools 172 can be arranged in tool families, where a tool family has one or more shared tool characteristic (e.g., a family 172A of solid carbide round tools having different diameters and tip radius that create the different cutting surface geometries, and a family 172B of insert tools having different diameters and metal inserts that create different cutting surface geometries). In addition, the CNC machine 170 can include other components and systems, such as rotatable platforms/attachments (e.g., for five-axis milling processes) and cleaning systems (e.g., sprayed water cleaning systems). Different cutting tools may be using during different stages of machining a part, and the different cutting tools may be used to induce forces at different locations on the part during machining, having different force magnitude, and for example, different directions. In such a case, in accordance with the types of machine tools and associated forces induced when machining, a number of holding tabs may be defined, where the holding tabs may be defined, for example, with a position, size, and orientation to correspond to the induced forces. In some implementations, a toolpath specification document 160 can be generated that includes one or more semi-finishing toolpaths that cause the CNC machine 170 to use one or more cutting tools 172 to perform semi-finishing operation(s) to cut a semi-finished structure from a workpiece to form the workpiece on which the finishing operation(s) are performed.

The toolpath specification document 160 (e.g., a numerical control (NC) program of an appropriate format) includes one or more finishing toolpaths that cause the CNC machine 170 to use one or more cutting tools 172 to perform finishing operation(s) to cut a physical object 180 (corresponding to the 3D model 132) from a workpiece.

In some instances, when a toolpath specification is defined in a computer-aided design program for a part to be machined, such as the CAD/CAM program(s) 116, the toolpath specification is provided to the CNC machine 170 to instruct machining of the part. When the part is machined from a workpiece, during all or a portion of the machining process, the part must remain stable inside the original material, i.e., the workpiece block of material, as it is machined in place. To provide such stability, one or more holding tabs are defined for the part, to bridge the part to the remaining part of the workpiece during the machining.

In some instances, during the manufacturing process of a small batch run of a single part out of a single block of material, the block has to be held fixed within the CNC machine 170. In such a case, the part does not move during the cutting operations performed with the cutting tools of the CNC machine 170. The block can be kept fixed in the CNC machine 170 during the machining of the part by providing a fixing of the part, so that the part stays stable during operations performed by the cutting tools. To provide stable fixture of the part, and to allow for the cutting tools to move and perform different cutting operations, different setups can be arranged for holding the part. The defined setups, and how the block is fixed to not move during the machining with a particular setup, can directly affect the freedom of movement of the cutting tools. Therefore, a definition of a setup can be provided in accordance with the cutting operations that are to be performed over the block to cut off stock material according to the toolpath.

In some instances, providing one setup for holding the block material during the machining is associated with a certain period of time for arranging the block with a fixture to position the block according to the setup. Therefore, by utilizing more setups for holding the block material during the machining, some more time is used for rearranging from one setup to another, which can be associated with a prolonged period for the whole machining process. Further, by increasing the necessary time to machine one part, the manufacturing process becomes more expensive, as within a set amount of time, fewer parts can be produced. In addition, each setup is associated with a toolpath or a portion of a toolpath.

Based on the toolpath information associated with a setup, machining tools are instructed to move in relation to the positioning of the block, and the block's location and orientations within the CNC machine 170. When more setups are arranged for machining a single part, more programming time and more programming resources are to be provided for defining the toolpaths corresponding to such setups, and thus machining is associated with higher costs. Therefore, by optimizing the number of setups for machining a part may optimize resource spending. By defining as few setups as possible to machine a part, machining time is reduced and fewer programming resources are spend, thus the manufacturing process as a whole is improved and is less expensive.

For example, a part can be manufactured by defining two setups—an initial one and a flipped-over one (e.g., one at a substantially opposite direction). When a block of material is fixed in the CNC machine 170, the block can be fixed at a first setup from the defined two setups, and the cutting tools approach the block to machine the part from one of the sides of the positioned block, e.g., the upped side. When the part is machined in this setup, the part is maintained fixed, in situ, during the cutting operations. Once machining operations from the first side of the block are performed, the block can be rearranged to the second setup, and the tools can approach the part from the other direction, e.g., the opposite one. In such cases, the tools of the CNC machine 170 may shape both sides of a part by utilizing two setups for fixing the block during machining the part.

In some instances, it may be preferred that the number of setups that are used for machining a part are limited to an upper threshold number, for example within the range of up to 3 to 5 setups. The definition of the setups for machining a part can be associated with the definition of positions of holding tabs to keep the part fixed, in situ, during the machining of the part. The positioning of the holding tabs may be based in part on the defined setups as the part is repositioned according to the different setups during machining and has to be kept fixed during the whole machining process. When holding tabs are defined for keeping a part fixed during machining, the holding tabs are arranged to keep the part fixed during multiple setups as per their definition for machining the part.

In some instances, the number of setups is minimized to identify an improved setup plan that simplified the rearrangement of the fixture of the block during machining the part and optimized programming resources spent, and therefore reduced the time invested during the whole machining process.

In some instances, a batch run of a set of different parts may be executed to machine out the set of parts out of a single block of material. In such case, the block has to be held fixed within the CNC machine 170, and the set of parts do not have to move during cutting operations performed with the cutting tools of the CNC machine 170. The block can be kept fixed in the CNC machine 170 during the machining of the multiple parts through different fixturings and correspondingly defined one or more setups for arranging to hold the block in place during machining.

When the parts are machined out of one block, the parts are to be maintained fixed, in situ, during the cutting operations. To keep the parts fixed, in situ, during the cutting operations, there may be sets of holding tabs provided correspondingly for each of the parts to keep the parts fixed and withstand the cutting forces applied to the block when cutting the set of parts. Therefore, for each of the parts to be machined from one block, there may be a corresponding set of holding tabs generated according to the cutting forces induced on the part when machining the multiple parts out of one single block. In some instances, forces applied when cutting a first part from the set may also be related to a second part from the set. For example, when the first and the second part are closely positioned one next to the other, induced forces for cutting at least a portion of the first part may be received at least on a portion of the second part.

In some instances, forces to be applied when cutting a first part from the block of material, may be relevant for generating holding tabs for a second part from the set. In such case, holding tabs generated for each of the parts to keep it fixed, in situ, may be generated in accordance with the forces applied when cutting each of the parts and, for example, one or more of the rest of the parts from the set.

The parts can be machined when multiple setups are defined for fixing the block, as discussed in relation to machining a single part out of a block of material with different setups. For example, the set of parts may be machined out with two setups. Once machining operations from the first side of the block are performed, the block can be rearranged to a second setup, and the tools can approach the parts from the other direction, e.g., the opposite one, to the direction associated with the first setup. In such cases, the tools of the CNC machine 170 may shape both sides of multiple parts by utilizing two setups for fixing the block during machining the part.

By providing holding tabs for the part during the machining, different machining operations may be performed over the workpiece, and the part would be held in place and be fixed, in situ, when different forces are applied in relation to the machining operations. Holding tabs may be defined at different positions for the piece. The positioning of the holding tabs may be defined or adjusted by a user interacting with the computer-aided design program. The holding tabs may be defined with different size and orientation, i.e., define different angles in relation to an area of surface where the tabs are attached.

In some instances, during the manufacturing process of a part, different forces are applied at different locations on the part. To keep the part fixed, holding tabs may be used for the purpose to retain the workpiece rigid enough to withstand different cutting forces applied. The cutting forces may be different at different stages of the manufacturing process. Different types of machining operations may be associated with different forces applied and having different directions. Further, when a part is machined, the operations may be performed at different sides of the part. For example, once machining processes are performed on a first side of the part, the workpiece may be flipped over and further machining processes can be performed on the other side. Such machining processes may be roughing operations, final cutting operations, among others. The different machining processes may be associated with different cutting forces applied with different directions, and/or applied at a different angle toward the surface of the part. Therefore, holding tabs may be defined with particular position, size, and/or orientation, according to the computed forces and force direction.

In some instances, the CAD/CAM programs(s) 116 may include implemented logic that may be instructions which when executed by the processor 112, cause the computer 110 to obtain a 3D model and to generate a toolpath specification in relation to manufacturing a first part from a workpiece. Based on the generated toolpath specification, predicted cutting forces can be calculated. The cutting forces can be predicted as to be induced on the workpiece when machining the part using the toolpath specification. Based on the calculation of the predicted cutting forces, the implemented logic may further include instructions to generate one or more sets of holding tab options, where one or more of the sets may be provided on the display device 120 for interaction by the user 190. In such manner, the sets of holding tabs can be generated to include at least one holding tab that is determined according to computed predicted cutting forces. When a set of holding tabs from the provided sets to the display device 120 is selected for use during manufacturing of the first part, the toolpath specification for machining the first part from the workpiece is modified, for example, by regeneration, to be adjusted to include the defined holding tab(s). The modified toolpath specification is provided from the CAD/CAM program(s) 116 to the CNC machine 170 for use during machining process as part of the provided instructions in relation to machining the part. The modified toolpath specification includes the generated and selected set of holding tabs that include at least one holding tab that is positioned to withstand the induced cutting forces.

In some implementations, the CAD/CAM program(s) 116 may receive information for one or more sets of holding tabs from another program, e.g., a program running on another computer, and the CAD/CAM program(s) 116 can present such sets of holding tabs as options for user interaction and selection. For example, the CAD/CAM program(s) 116 can generate a toolpath specification, provide this toolpath specification to the other program, which then defines various holding tabs options, and receive back the various holding tabs options from the other program. The information for the holding tab options may be received by the CAD/CAM programs(s) 116 The other computer or software component can be communicatively coupled to the computer 110 and the CAD/CAM program(s) 116 running on the computer 110. The implemented logic for the generation of holding tabs in accordance with computed predicted cutting forces may be according to process flows described in relation to FIG. 2 and FIG. 3.

In some instances, the number of holding tabs may be reduced during different phases of machining. For example, during a roughing process, a greater strength to resist the forces applied on the part during roughing operation can be provided by holding the part, and thus more holding tabs may be necessary, in comparison to a finishing process, where cutting forces are of lower magnitude. In some instances, after a roughing phase is performed that is associated with stronger forces induced on the part during machining, one or more of the holding tabs can be machined to be smaller, or maybe removed entirely. The next phase after the roughing phase, such as a semi-finishing or finishing operation, is associated with forces of a lower strength compared to the roughing operation, and therefore require less numbers of holding tabs, or one or more holding tabs of a smaller size compared to the size of the holding tabs at the roughing phase, can be configured to provide the expected stability of the part to be fixed to the workpiece during machining. For example, a holding tab from the holding tabs used during the roughing phase may be modified to have a smaller size, based on evaluation of the position of the holding tab, and the expected induced cutting forces in relation to that position during a subsequent phase.

Figure 2:
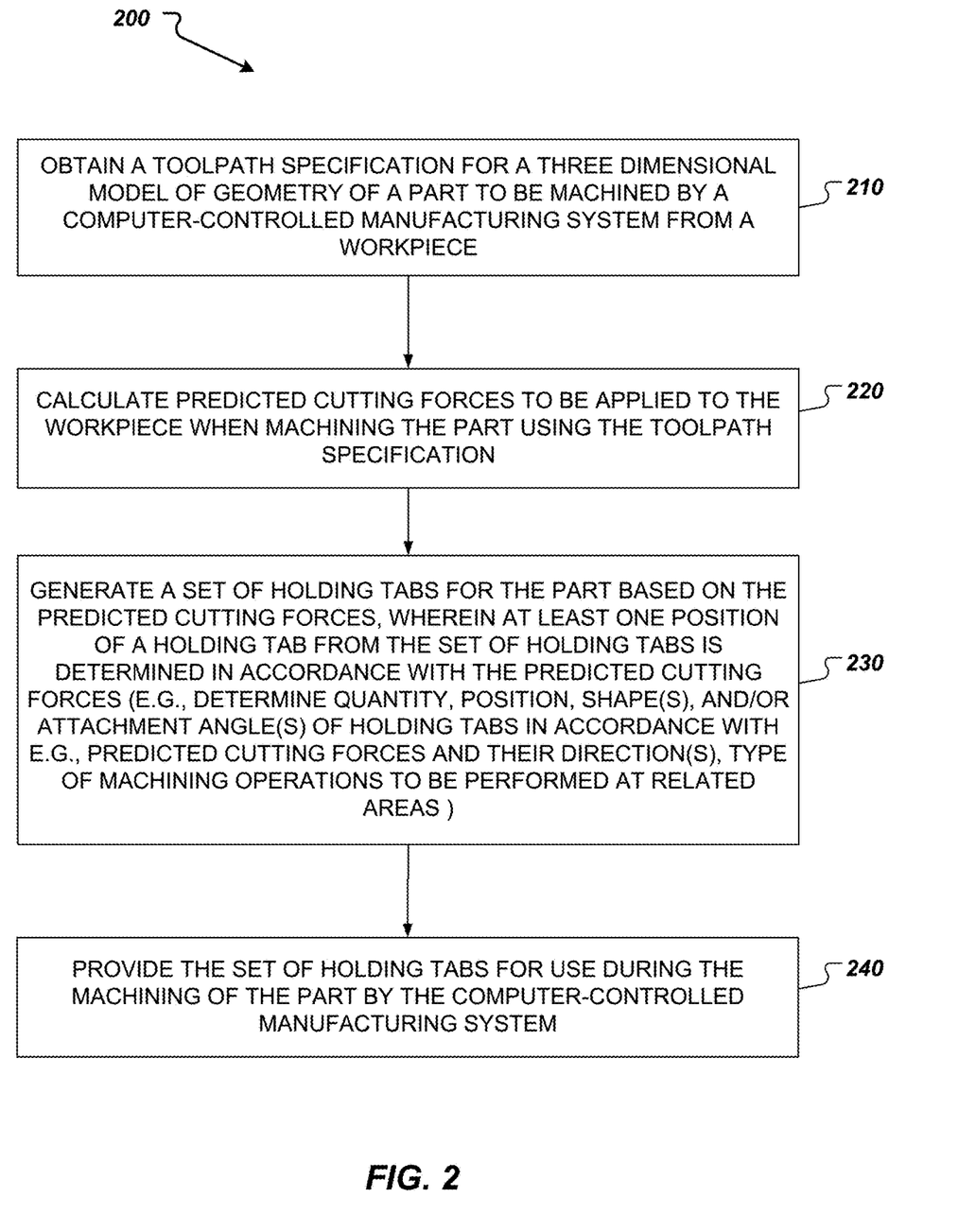
FIG. 2 shows a an example of a process to determine a set of holding tabs for use during machining of a part by a computer-controlled manufacturing system.

FIG. 2 shows an example of a process 200 to determine a set of holding tabs for use during machining of a part by a computer-controlled manufacturing system. For example, the process 200 may be implemented as part of a computer-aided design or manufacturing program running in relation to a computer-controlled manufacturing system for machining parts from workpieces of different material and shape. In yet another example, the process 200 may also be executed outside of a CAD/CAM program, at a separate program including implemented logic to process generated toolpath specification and generate holding tab option. The process output may be fed into such a CAD/CAM program or directly provided to a computer-controlled manufacturing system for machining parts from workpieces, such as the CNC machine 170 of FIG. 1.

In some instances, the set of holding tabs determined by the process 200 may be provided as output for display at a user interface of the computer-aided design program where a user may interact with the provided holding tabs as options for selection or adjustment based on user input.

At 210, a toolpath specification for a three dimensional model of geometry of a part is obtained. The part is defined by the three dimensional model to be machined by a computer-controlled manufacturing system (e.g., CNC machine 170) from a workpiece. The toolpath specification may be, for example, a rouging, semi-finishing, finishing toolpath specification, e.g., obtained by the program(s) 116 running on computer 110 and/or computer 150 of FIG. 1.

In some cases, obtaining the toolpath specification may include generating the toolpath specification, and in some other cases, may involve receiving the toolpath specification from another source. The 3D geometry of the part can be specified in a 3D model prepared by a user (e.g., user 190 using program 116 on computer 110 of FIG. 1), and CAD/CAM program algorithms can be used to calculate the finishing toolpath specification.

In some implementations, obtaining (200) the toolpath specification involves creating the toolpath specification based on a 3D model of the part and user input regarding one or more cutting conditions. The cutting conditions can include information regarding different cutting tools and cutting data for different cutting tools usable in a computer-controlled manufacturing system (e.g., CNC machine 170). For example, the information can include various machining parameters, such as tool size, shape, and number of flutes, depth of cut, feed rate, spindle speed, plunge rate, step-over and step-down, workpiece material (e.g., aluminum or steel) and tool material (e.g., carbide) specifications. In general, any suitable information (e.g., test data) that impacts how the workpiece will respond during applied cutting forces. In some implementations, some or all of the cutting conditions are obtained from another source (e.g., a provider of the computer-controlled manufacturing system).

In some instances, the part may be machined from the workpiece during different machining operations and processing where cutting forces are applied to the workpiece to produce the part as defined by the specification. Different machining operations may be associated with different cutting forces that are associated with different tension and force applied at portions or points over the surface of the workpiece and the part during the machining phase. For example, roughing operations may be associated with higher cutting forces compared to forces applied during a semi-finishing or a finishing operation.

At 220, the predicted cutting forces to be applied to the workpiece when machining the part using the toolpath specification are calculated. When the part is machined from the workpiece, different cutting forces are applied at different positions on the workpiece during machining according to the toolpath. The cutting forces may be defined by their magnitude and their direction. The cutting forces may be associated with the type of machining operations performed to machine the part. The machining operations may include roughing, semi-finishing, and finishing. For example, for operations requiring higher forces, such as roughing operations, the size of the holding tabs may be larger, compared to tab size, when performing semi-finishing or finishing processes. In yet another example, for operations requiring higher forces, there may be more holding tabs defined, to compensate for the higher magnitude of the forces applied, in comparison to operations requiring forces of a lower magnitude. In such cases, multiple options for sets of holding tabs may be defined in relation to the calculated predicted cutting forces. Some of the sets may be associated with a higher number of holding tabs to compensate for forces with higher magnitude, where other sets may be associated with tabs that are of a bigger or varying size, to leverage the forces and to keep the part fixed, in situ, during machining.

In some instances, the size of the holding tabs can be reduced during the machining process, starting from roughing operation through semi-finishing and finishing operations.

In some instances, CAD/CAM program algorithms can be used to simulate machining the part from the workpiece using one or more tools, and determine the tooling forces that will be applied to the workpiece during a particular machining operation. The simulation process can be parallelized (e.g., multiple programs 116) and/or be performed either on the local computer (e.g., computer 110 or CNC machine 170) or on remote computer(s) (e.g., one or more remote computer systems 150).

Further, performing cutting operations can be associated with cutting conditions that reflect on the calculations of the cutting forces applied. In such case, information about the cutting conditions can be provided as input when calculating the cutting forces that are to be applied on the part during machining. The cutting conditions may include information regarding different cutting tools and cutting data for the different cutting tools usable in the computer-controlled manufacturing system (e.g., CNC machine 170). For example, cutting conditions such as cutting speed (e.g., the speed of rotation of a milling cutter), depth of cutting, feed (e.g., the rate at which the cutting tool crosses the workpiece).

At 230, a set of holding tabs for the part are generated based on the predicted cutting forces. Each of the holding tabs bridges from the part to the workpiece so as to keep the part fixed, in situ, within the workpiece during the machining of the part from the workpiece. A position of a holding tab from the set of holding tabs may be determined in accordance with the predicted cutting forces at 220. By positioning a holding tab, the toolpath that is used for machining the part may be constrained, and the part would be kept fixed during the machining without separation.

In some instances, each of the set of holding tabs may be determined in accordance with the computed predicted cutting forces and further, for example, may be determined based on identified directions of the applied cutting forces.

In some instances, the holding tabs are defined with sizes in accordance with the predicted cutting forces. Further, the holding tabs may be defined with a shape and an attachment angle. A first holding tab from the set of holding tabs defined at 230, may be determined based on the predicted cutting forces, and the one or more directions of the predicted cutting forces. In some instances, all of the holding tabs within the set may be defined based on the predicted cutting forces. For example, two holding tabs within the set may have different sizes, shapes and orientations to provide support for the machined part during a machining operation, such as roughing. The size, shape, or the attachment angle may be directly correlated, and proportional to the magnitude of the induced force on the workpiece, when machining the part at a location substantially close, or relatively the same, and covering the position of the holding tab.

In some instances, the dimension of a tab at the point where it contacts the part is defined based on the cutting forces, including directions, so as to hold the part in place and also optimize (e.g., minimize post-removal finishing).

In accordance with some implementations of the present disclosure, a plurality of sets of holding tabs may be generated, where the sets define different holding tab options to keep the part fixed, in situ, within the workpiece during machining. For example, a first set of holding tabs and a second set of holding tabs may be defined as alternative combinations of holding tabs, positioned at different location, where both options would provide fixing of the part without movement during the machining. Any one of the plurality of sets may be defined based on the predicted cutting forces. In some instances, the generation of the different holding tab options may be provided, based on additional input and/or criteria, that can be considered for the options. For example, the additional input may be constraints at certain regions on the model of the part, specifics of the machining that would prevent the normal machining process, and/or other preferences that may be provided through user input.

At 240, the set of holding tabs is provided for use during the machining of the part by the computer-controlled manufacturing system. For example, the set of holding tabs may be provided for display at a user display device. The user display device may be communicatively coupled to the computer-controlled manufacturing system, or may be integrated within the system. When the set of holding tabs is provided for the user, the holding tabs may be visualized over a three dimensional display of the geometry of the part to be machined. Further, the visualization of the three dimensional view of the part and the projected holding tabs may be provide for user interaction. For example, a user may interact with the visualization to perform operations on the provided set of holding tabs, such as modification of the position, size, and/or orientation of the holding tabs.

In some instances, input received for the provided set of holding tabs may be input for further evaluation and consideration according to the calculated predicted cutting forces and further considerations, including the received input, quantity of the holding tabs, physical conditions when performing the machining, etc.

In some instances, the generation of the set of holding tabs can include generating one or more toolpath specifications to machine the part from the workpiece while retaining the holding tabs, and then sending the one or more toolpath specifications to the CNC machine 170 to cause machining of the part. The toolpath specification and the generated set of tabs may be provided for use in machining the part by the computer-controlled manufacturing system (e.g., CNC machine 170) by cutting away portions of the stock material in a series of two or more operations.

For example, a roughing operation (the process of removing material to approach the net shape of the part and minimize the amount of material to be removed during later semi-finishing and/or finishing phases) may be required in some but not all cases, depending on the nature of the part and the starting workpiece. Thus, in some implementations, a roughing toolpath specification is obtained and provided for use in machining the part by the computer-controlled manufacturing system (e.g., CNC machine 170) together with a set of holding tabs to keep the part fixed, in situ, during the machining. The roughing toolpath specification may be used by the computer-controlled manufacturing system. When the part is machined, a portion of the stock material is cut away to form the rough structure of the part from the workpiece. The rough structure of the part is kept fixed within the workpiece as it is bridged to the other part of the workpiece by the holding tabs. In such manner, the roughed structure of the part is produced and maintained fixed within the workpiece with the holding tabs before performing the semi-finishing operation on the roughed structure.

In some implementations, the roughing operation may be followed by a semi-finishing operation, which may be followed by a finishing operation. Further, after the finishing operation, the part may be cut from the workpiece by cutting the holding tabs. In such case, there may be further operations, such as grinding and/or sanding performed for the remaining portions of the tabs, that are attached to the part so as to provide a finished part.

In some instances, a first set of holding tabs may be selected from a set of provided holding tab options for use by a computer-controlled manufacturing system, during a first phase of machining of a part, such as roughing phase, that is kept fixed during machining by the holding tabs in the selected set. For a subsequent phase, such as semi-finishing and/or finishing, the first set of holding tabs may be adjusted to reduce the number of holding tabs or their size as the subsequent phases are associated with cutting forces of lower magnitude. In such case, different sets and sub-sets of holding tabs may be defined for different phases of machining of a part to keep the part fixed during the whole process, while optimizing the number and size of holding tabs. Once the part is machined, it can be cut from the workpiece and the tabs may extend from the part, where grinding and/or sanding operations may be performed to provide the part in a final finished state.

Figure 3:
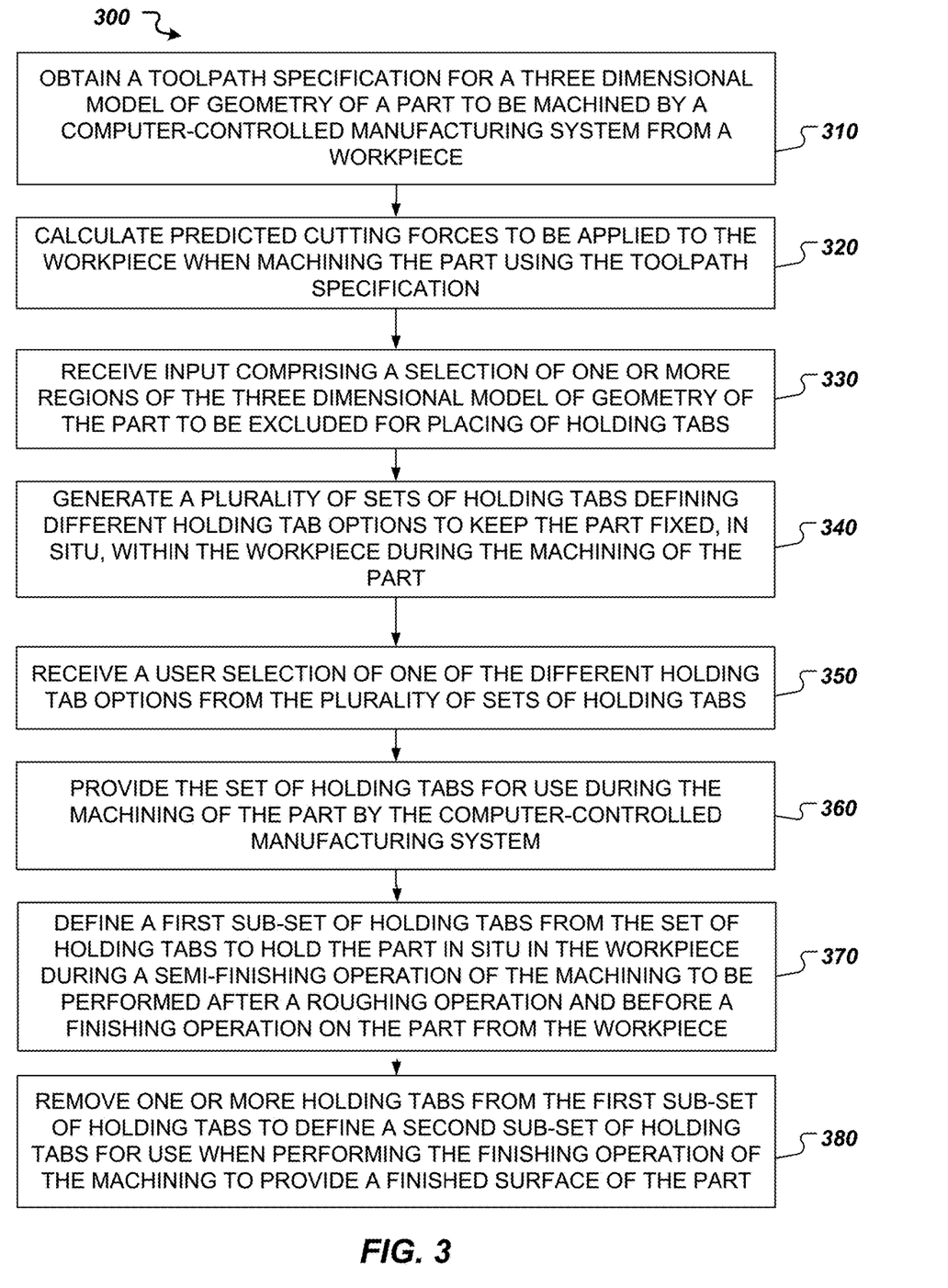
FIG. 3 shows an example of a process to determine a plurality of sets of holding tabs defining different holding tab options to keep the part fixed, in situ, within the workpiece during machining of the part by a computer-controlled manufacturing system.

FIG. 3 shows an example of a process 300 to determine a plurality of sets of holding tabs defining different holding tab options to keep the part fixed, in situ, within the workpiece during machining of the part by a computer-controlled manufacturing system.

For example, the process 300 may be implemented as part of a computer-aided design or manufacturing program running in relation to a computer-controlled manufacturing system for machining parts from workpieces of different material and shape. In yet another example, the process 300 may also be executed outside of a computer-aided design or manufacturing program. For example, the process 300 may be executed at a communicatively coupled component to the computer-aided design or manufacturing program. In yet another example, the process 300 may be implemented at an application service that can be provided as a web service being invoked through an exposed application programming interface (API) based on an appropriate input according to a predetermined standard. The process output may be fed into a CAD/CAM program, such as the CAD/CAM program 116 of FIG. 1. Further, the process output may be directly provided to a computer-controlled manufacturing system for machining parts from workpieces, such as the CNC machine 170 of FIG. 1.

At 310, a toolpath specification is obtained for a three dimensional model of geometry of a part to be machined by a computer-controlled manufacturing system from a workpiece. The obtained toolpath specification can be such as the toolpath specification 160 of FIG. 1, and/or the obtained toolpath specification at 210 of FIG. 2. The toolpath specification can be generated for a part that is to be machined from a workpiece and be kept fixed during machining. To keep the part fixed during machine, holding tabs can be provided, such as the holding tabs discussed in relation to FIG. 1 and/or FIG. 2. The toolpath specification that is obtained for the three dimensional model can be a toolpath specification for performing a roughing phase when machining a part from a workpiece.

At 320, predicted cutting forces to be applied to the workpiece when machining the part using the toolpath specification are calculated. When the part is machined from the workpiece, different cutting forces are applied at different positions on the workpiece during machining according to the toolpath. The cutting forces may be defined by their magnitude and their direction.

At 330, input is received. In some instances, the input may be received before 310. The input includes a selection of one or more regions of the three dimensional model of geometry of the part to be excluded for placing of holding tabs. In some implementations, when the input is received before 310, the input may be taken into consideration for the generation of the toolpath specification, as the selection may be appreciated as a constraint parameter for the toolpath specification generation.

In some instances, regions from the three dimensional model of the geometry of the part may be excluded when they are related to performing further operations with the machined part. For example, such a region may be an area of the part that is to be attached to another machined part to generate a collective component including multiple machined parts. In such case, the region may be excluded from positioning of holding tabs as this region is to be attached to another part, and the finished surface of the part has to identically match to the receiving surface of the other part, to be able to generate a final collective component that adheres the machined parts properly.

There may be different considerations why a holding tab is not appropriate to be positioned at a certain area of a part. For example, a particular area of the geometry may be of a specific form and shape that may unduly extend a finishing operation, if there are holding tabs positions there during an initial roughing operation.

At 340, a plurality of sets of holding tabs are generated. A set of holding tabs from the plurality of sets defines a holding tab option to keep the part fixed, in situ, within the workpiece during the machining of the part. In some instances, the plurality of sets may be defined as equivalent alternatives that withstand the predicted cutting forces in a corresponding manner.

In some instance, the holding tabs within a set from the plurality of sets may have different shape, size, and/or attachment angle. These may be determined in accordance with the predicted cutting forces and one or more directions of the predicted cutting forces.

In some instances, two or more of the sets of holding tab options may be associated with a different quantity of holding tabs. Further, there may be two holding tab options defining the same number of holding tab options defined at different locations.

In some instances, two or more of the sets of the holding tab options may define the same number of holding tabs located at the same position, and differentiating by their size and orientation.

When the holding options are generated based on calculations performed in relation to predicted cutting forces and/or cutting force directions, the number of holding tabs in a given set is not randomly selected, but corresponds to an optimized number of tabs to hold the part, in situ, that are determined. As the holding tabs defined within one set correspond to the calculated cutting forces, the quantity of holding tabs is determined to correspond to these calculated cutting forces and thus an optimal number of tabs are defined. If the number of holding tabs does not correspond to the magnitude of the expected forces, the machining process may be inefficient. For example, if the number of tabs is too low to keep the part fixed, there may be a breakage of the part from the workpiece when these forces are applied. In another example, there may be an excess in the number of holding tabs that would necessitate more finishing operations for the cut tabs once the part is separated from the workpiece. Moreover, the excessive number of holding tabs may impose constraints to the toolpath, thus resulting in a longer time for producing the part than expected.

As the holding tabs constrain the toolpath when the part is machined, improving the number of holding tabs positioned in relation to the geometry of the part may improve the machining process. For example, the part may be machined faster and with fewer processing operations to adjust the toolpath, based on fewer restrictions provided by the defined holding tabs. Further, the finishing operations would be improved, as there may be fewer steps to remove the holding tabs and finish the surface of the part. As the number of holding tabs is optimized to correspond to the cutting forces (as discussed above, for example, in relation to FIG. 1 and FIG. 2 and the determination of positions of the holding tabs), when the part is to be separated from the workpiece, the number of operations to adjust the surface and cut the holding tabs would be also optimized, as there would be no excessive number of tabs to be finished afterwards. For example, the amount of manual grinding or sanding in relation to the tabs may be reduced.

In some instances, the generation of the plurality of sets of holding tabs as options may take into consideration the received input as selection of the regions to be excluded from positioning of holding tabs during the determination of the positions of the holding tabs in any one of the plurality of sets. In some other instances, a plurality of option sets may be generated, and they may be filtered to identify a sub-set of the option sets that correspond to the received input criteria.

In accordance with some implementations of the present disclosure, it may be appreciated that 330 and 340 may be performed in the order as described above and displayed on FIG. 3, or in the order of first 340 and then 330, where an additional method step may be incorporated that reflects the received input on the definition of sets of holding tabs that comply with the received excluded regions.

In some instances, one or more regions of the three dimensional model may be excluded for providing holding tabs. In such case, the regions of the part where holding tabs can be connected may be limited.

At 350, a user receives a selection of one of the different holding tab options from the plurality of sets of holding tabs. In some instances, the generated plurality of sets of holding tabs may be provided for display at a display device. For example, the different sets of holding tabs may be presented on a user interface including the geometry of the part, where the different sets of holding tabs may be represented with visual distinction to assist the user of identifying holding tabs corresponding to each of the sets.

For example, the received selection may be a selection of a single set from the plurality of holding tab options. A selection of one set of holding tabs may be received, and based on the received selection, an instruction for machining the part can be provided to a computer-controlled manufacturing system. The provided instructions to the computer-controlled manufacturing system can include instructions for moving machine tools according to a generated toolpath specification that includes details defining the set of holding tabs according to the selection. Such instructions for machining the part may include information about positioning of the holding tabs on the part. Based on executing cutting operations on the workpiece, the holding tabs can be provided on the part, and may be arranged with a particular tab's shape, size, location, orientation, or other, as defined at the selected set of holding tabs. Based on the provided instructions, the computer-controlled manufacturing system can performing cutting operations over the workpiece to remove material from the workpiece, and to produce a part that is fixed to the workpiece, based on the set of holding tabs.

In some instances, the user may also be provided with editing options for the set of holding tabs, for example, to adjust, delete, modify, and/or add one or more holding tabs. The editing functionality provided to the user may be related to the presence of a holding tab, and also the size, shape, location, and/or orientation (e.g., attachment angle) of the holding tab. In some instances, once editing of a set of holding tabs is performed, the edited set of holding tabs may be evaluated based on the predicted cutting forces, and an evaluation result for the edited set may be provided. For example, changes to the set of holding tabs may include an addition of a holding tab, an adjustment of a holding tab, a removal of a holding tab, or combination thereof. The evaluation result may be presented in a quantifiable manner in relation to the correspondence to the cutting forces. Further, an alternative to the edited set of holding tabs may be provided as an alternative suggestion based on the edits received for one or more of the holding tabs.

At 360, the set of holding tabs is provided for use during the machining of the part by the computer-controlled manufacturing system. For example, providing the holding tabs according to 360 of FIG. 3 may correspond to the discussed providing of holding tabs in relation to 240 of FIG. 2.

At 370, a first sub-set of holding tabs from the set of holding tabs to hold the part, in situ, in the workpiece is defined. In some instances, the different machining operations can be simulated to determine different cutting forces applied on the workpiece during machining. Based on calculating the predicted cutting forces, a set of holding tabs for the machining operations can be defined. For example, a set of holding tabs may be defined for a roughing operation. A sub-set of the set of holding tabs for the roughing operation can be further defined, where the sub-set includes one or more first holding tabs from the set defined for the roughing operation that are included in the subset unchanged, and may include one or more second holding tabs from the set defined for the roughing operation that are adjusted, and for example, are provided with a different size of shape compared to their original one at the set of holding tabs for the roughing operation. In such case, the sub-set of holding tabs is of a different number and/or size for a later operation, such as, a semi-finishing or finishing operation.

In some instances, the first sub-set of holding tabs may be defined to hold the part, in situ, on the workpiece during a semi-finishing operation of the machining to be performed after the roughing operation, and before the finishing operation, on the part from the workpiece.

The sub-set of holding tabs may be defined in accordance with the cutting forces that are to be applied on the part during the subsequent machining operation, such as the semi-finishing operation. For example, the semi-finishing operation may be defined based on a semi-finishing toolpath specification that can be obtained, and cutting forces to be applied on the part, during such semi-finishing operation may be calculated to generate the sub-set of holding tabs 370.

In some instances, the definition of the first sub-set of holding tabs may include defining holding tabs from the set of holding tabs that are to remain to bridge from the part, and to extend to the rest of the working piece during the semi-finishing operation. In some more instances, a holding tab from the first sub-set of the holding tabs may be adjusted in its size or shape, for example, in accordance with the applied cutting forces and their direction, and also for example, on user instructions and/or selections.

At 380, one or more of the holding tabs from the first sub-set of holding tabs are removed to define a second sub-set of holding tabs. In accordance with some implementations of the present disclosure, the second sub-set of holding tabs are for use when performing the finishing operation of the machining on the part to provide a finished surface of the part.

Figure 4A:
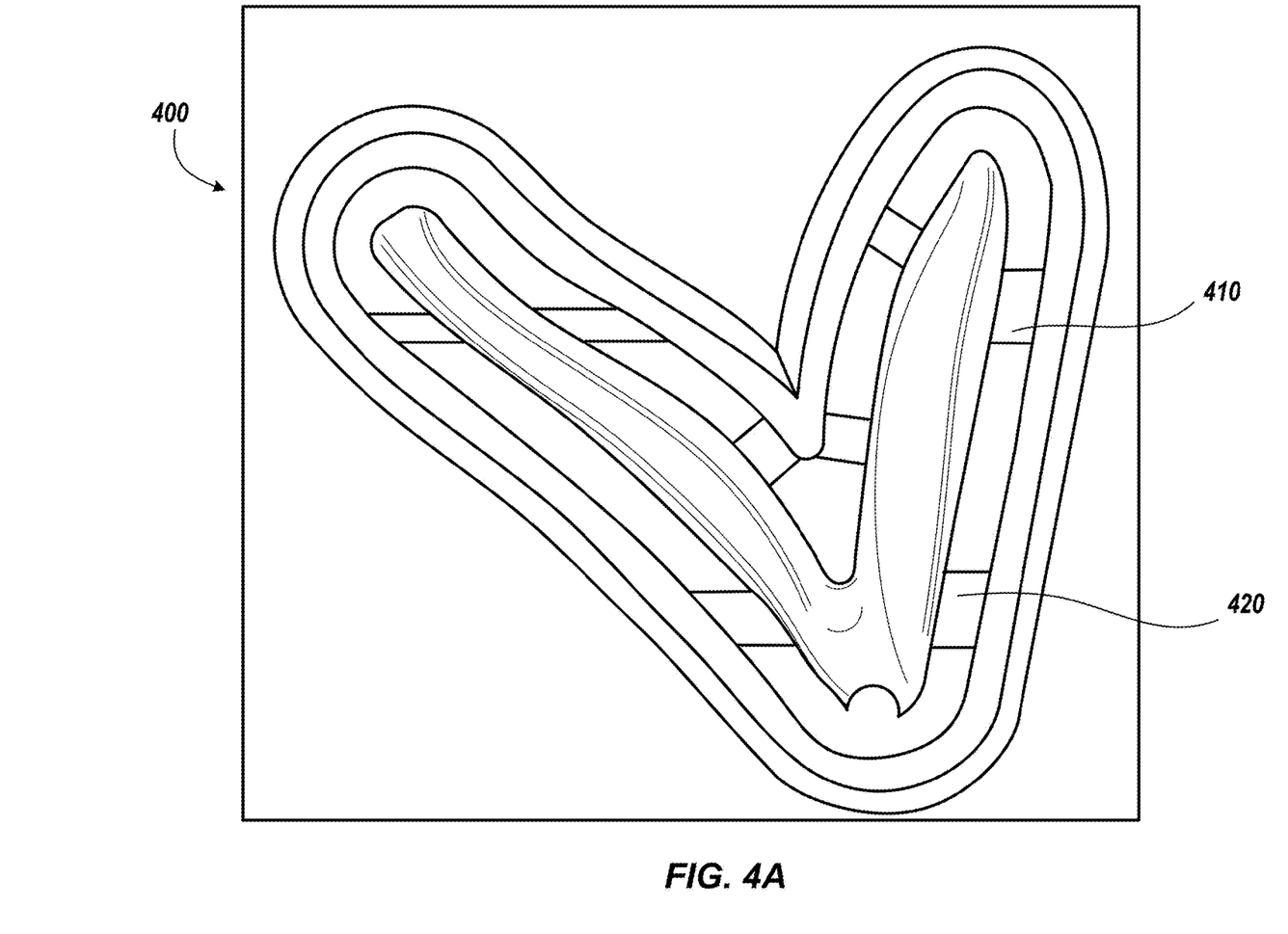
FIG. 4A shows an example of a part during manufacturing using computer-controlled machining systems and techniques.

FIG. 4A shows an example of a part machined from a workpiece 400 during manufacturing, using computer-controlled machining systems and techniques. The part may be machined from the workpiece 400 and supported to stay fixed, in situ, to the workpiece 400 by holding tabs. The holding tabs can be positioned in relation to the surface of the part and can be defined as described in relation to process 200 of FIG. 2 and/or process 300 of FIG. 3. FIG. 4A provides a planer projection of the workpiece 400 for machining of a part that has a three dimensional geometry. The part is presented during machining and when fixed to the workpiece 400, the part can be presented as a two dimensional representation of the three dimensional model.

The part may be provided with eight holding tabs to be fixed to the workpiece 400 during machining. For example, the holding tabs include holding tab 420 and holding tab 410. The holding tabs may be of different size, shape, and may be arranged with a particular angle of attachment to the piece to bridge from the part to the rest of the workpiece 400 during machining.

The holding tab 420 may be defined with a corresponding position and/or size and shape in accordance with cutting forces and cutting force directions applied during machining the part, for example, at a particular phase of machining. For example, the eight holding tabs presented on FIG. 4A may be defined for a roughing operation performed on the part.

In some instances, after a roughing operation is performed for the part, one or more of the eight holding tabs may be removed or modified before proceeding with a subsequent semi-finishing operation. In some instances, when holding parts are defined for the part to be machined out the workpiece 400, regions of the part may be excluded for positioning of holding tabs. For example, such regions may be associated with locations where the part is to be attached to other machine parts as part of a larger configuration of components or a system.

Figure 4B:
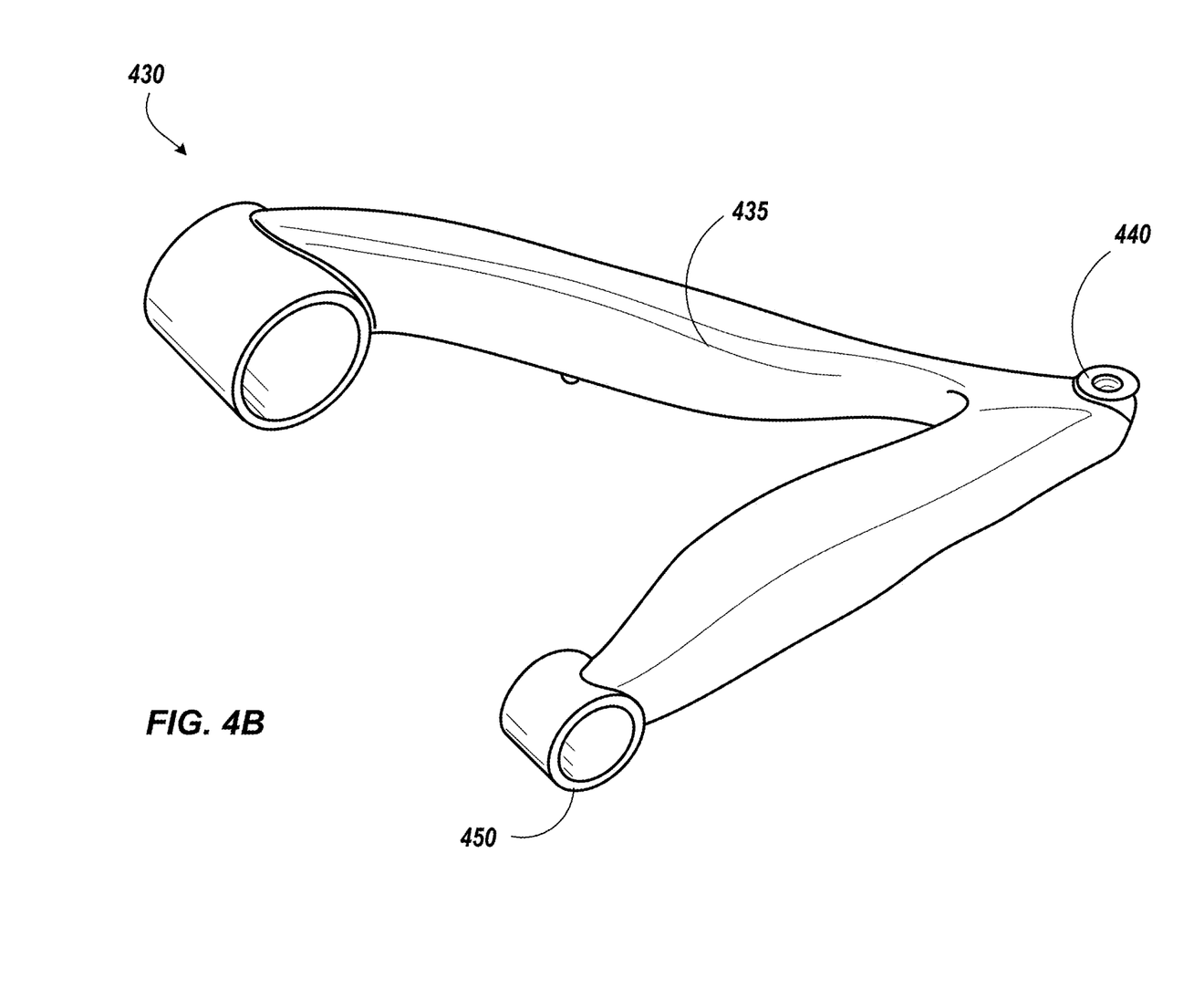
FIG. 4B shows an example of a part machined based on a manufacturing using computer-controlled machining systems and techniques.

FIG. 4B shows an example of a piece 430 which was machined based on manufacturing using computer-controlled machining systems and techniques.

The piece 430 may be a result of machining and attaching multiple machined parts to generate the piece 430. For example, the piece 430 may include a part 435, such as the part machined from the workpiece 400 of FIG. 4A, a part 440 that is attached to the part 435 at one of its ends, and a part 450 that is attached to part 435 at another one of its ends. Therefore, the parts that are part of piece 430 may be machined when provided with holding tabs, for example, as generated according to a method for defining holding tabs in accordance with cutting forces applied on the part during the machining. For example, the holding tabs that are provided during machining the parts may be based on an output from a method such as the process 200 of FIG. 2 and/or process 300 of FIG. 3.

The part 435, of the piece 430 may be manufactured from the workpiece 400 of FIG. 4A where there were multiple holding tabs, such as holding tab 420 and 410 of FIG. 4A. During machining, the part of FIG. 4A has been connected with the workpiece through the holding tabs. For example, the holding tabs may have been removed after the part was separated from the workpiece 400. Further, the part of FIG. 4A is attached to other machined parts—part 440 and part 450. The other parts, 440 and 450, may represent connectors attached to the part 435 to allow for more parts (not shown) to be connected to the part 435 and to form a system or machine. For example, the part 450 may allow for the part 435 to be attached to further parts or pieces with a bolt. Further, the part 440 may allow for the part 435 to be attached to other parts or pieces with a pin.

In some instances, as the piece 430 is arranged by attaching multiple smaller parts, such as the part machined out of the workpiece 400 as discussed in relation to FIG. 4A, the generation of the holding tabs for machining the smaller parts may be performed when taking into consideration regions where these smaller parts are to be attached to form the piece 430. In some instances, to improve the attachment characteristics of parts machined using holding tabs, the holding tabs may be positioned at areas that do not include regions for connection and/or stitching of the part with one another, to improve on the parts positioning and stability to form a bigger component.

Figure 5:
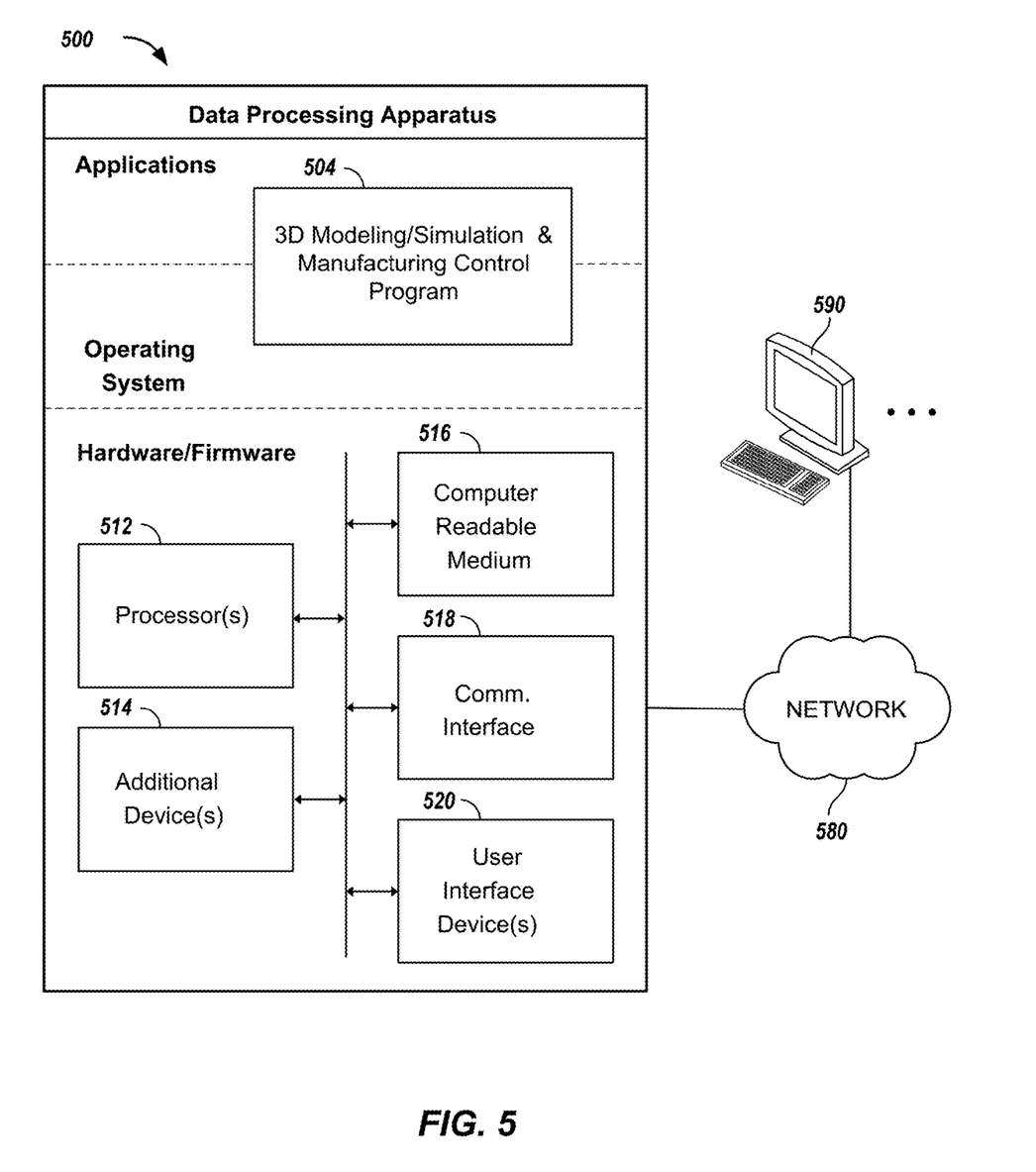
FIG. 5 is a schematic diagram of a data processing system usable to implement the described systems and techniques.

FIG. 5 is a schematic diagram of a data processing system including a data processing apparatus 500, which can be programmed as a client or as a server. The data processing apparatus 500 is connected with one or more computers 590 through a network 580. While only one computer is shown in FIG. 5 as the data processing apparatus 500, multiple computers can be used. The data processing apparatus 500 includes various software modules, which can be distributed between an applications layer and an operating system. These can include executable and/or interpretable software programs or libraries, including tools and services of a 3D modeling/simulation and manufacturing control program 504 that implement the systems and techniques described above. The number of software modules used can vary from one implementation to another. Moreover, the software modules can be distributed on one or more data processing apparatus connected by one or more computer networks or other suitable communication networks.

The data processing apparatus 500 also includes hardware or firmware devices including one or more processors 512, one or more additional devices 514, a computer readable medium 516, a communication interface 518, and one or more user interface devices 520. Each processor 512 is capable of processing instructions for execution within the data processing apparatus 500. In some implementations, the processor 512 is a single or multi-threaded processor. Each processor 512 is capable of processing instructions stored on the computer readable medium 516 or on a storage device such as one of the additional devices 514. The data processing apparatus 500 uses the communication interface 518 to communicate with one or more computers 590, for example, over the network 480. Examples of user interface devices 520 include: a display; camera; speaker; microphone; tactile feedback device; keyboard; mouse; and VR and/or AR equipment. The data processing apparatus 500 can store instructions that implement operations associated with the program(s) described above, for example, on the computer readable medium 516 or one or more additional devices 514, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions, and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including: semiconductor memory devices (e.g., Erasable Programmable Read-Only Memory (EPROM) and Electrically Erasable Programmable Read-Only Memory (EEPROM); flash memory devices; magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD), an organic light emitting diode (OLED), or another monitor for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A computer-implemented method comprising:
   obtaining a toolpath specification for a three dimensional model of geometry of a part to be machined by a computer-controlled manufacturing system from a workpiece;
   calculating predicted cutting forces to be applied to the workpiece when machining the part using the toolpath specification;
   generating a set of holding tabs for the part based on the predicted cutting forces, wherein each of the holding tabs bridges from the part to the workpiece so as to keep the part fixed, in situ, within the workpiece during the machining of the part from the workpiece, and wherein at least one position of a holding tab from the set of holding tabs is determined in accordance with the predicted cutting forces; and
   providing the set of holding tabs for use during the machining of the part by the computer-controlled manufacturing system.

2. The method of claim 1, wherein positions of the holding tabs of the set of holding tabs and a quantity of the holding tabs are determined in accordance with the predicted cutting forces and one or more directions of the predicted cutting forces.

3. The method of claim 2, wherein the holding tabs are defined with sizes in accordance with the predicted cutting forces.

4. The method of claim 2, wherein a shape and an attachment angle defined for a holding tab from the set of holding tabs is determined based on the predicted cutting forces and the one or more directions of the predicted cutting forces.

5. The method of claim 1, wherein generating the set of holding tabs comprises generating a plurality of sets of holding tabs defining different holding tab options to keep the part fixed, in situ, within the workpiece during the machining of the part.

6. The method of claim 5, further comprising:
receiving a user selection of one of the different holding tab options from the plurality of sets of holding tabs, and
wherein providing the set of holding tabs for use during the machining of the part comprises providing the selected one of the different holding tab options as the set of holding tabs to be used when performing the machining of the part.

7. The method of claim 1, further comprising:
receiving input comprising a selection of one or more regions of the three dimensional model of geometry of the part to be excluded for placing of holding tabs,
wherein generating the set of holding tabs comprises excluding the one or more regions at the three dimensional model from regions of the part available for connection to holding tabs.

8. The method of claim 1, wherein a size of a holding tab is defined based on a type of machining operation to be performed at an area where the holding tab is to be placed, wherein the type of machining operation is associated with a corresponding predicted cutting force to be induced on the part when performing the type of machining operation.

9. The method of claim 1, wherein generating the set of holding tabs comprises:
defining a first sub-set of holding tabs from the set of holding tabs by removing one or more holding tabs from the set of holding tabs, wherein the first sub-set of holding tabs is defined to hold the part, in situ, in the workpiece during a semi-finishing operation of the machining to be performed after a roughing operation and before a finishing operation on the part from the workpiece.

10. The method of claim 9, wherein generating the set of holding tabs further comprises:
removing one or more holding tabs from the first sub-set of holding tabs to define a second sub-set of holding tabs for use when performing the finishing operation of the machining to provide a finished surface of the part, wherein the second sub-set of holding tabs maintains the part, in situ, within the workpiece during the finishing operation.

11. A system comprising:
a data processing apparatus including at least one hardware processor; and
a non-transitory computer-readable medium encoding instructions of a computer-aided design or manufacturing program, the instructions being configured to cause the data processing apparatus to
obtain a toolpath specification for a three dimensional model of geometry of a part to be machined by a computer-controlled manufacturing system from a workpiece;
calculate predicted cutting forces to be applied to the workpiece when machining the part using the toolpath specification;
generate a set of holding tabs for the part based on the predicted cutting forces, wherein each of the holding tabs bridges from the part to the workpiece so as to keep the part fixed, in situ, within the workpiece during the machining of the part from the workpiece, and wherein at least one position of a holding tab from the set of holding tabs is determined in accordance with the predicted cutting forces; and
providing the set of holding tabs for use during the machining of the part by the computer-controlled manufacturing system.

12. The system of claim 11, wherein positions of the holding tabs of the set of holding tabs and a quantity of the holding tabs are determined in accordance with the predicted cutting forces and one or more directions of the predicted cutting forces.

13. The system of claim 11, wherein the instructions configured to cause the data processing apparatus to generate the set of holding tabs comprise instructions configured to cause the data processing apparatus to:
generate a plurality of sets of holding tabs defining different holding tab options to keep the part fixed, in situ, within the workpiece during the machining of the part.

14. The system of claim 13, wherein the non-transitory computer-readable medium encodes the instructions configured to cause the data processing apparatus to:
receive a user selection of one of the different holding tab options from the plurality of sets of holding tabs, and
wherein the instructions to provide the set of holding tabs for use during the machining of the part comprises instructions configured to cause the data processing apparatus to provide the selected one of the different holding tab options as the set of holding tabs to be used when performing the machining of the part.

15. The system of claim 11, wherein the non-transitory computer-readable medium encodes the instructions configured to cause the data processing apparatus to:
receive input comprising a selection of one or more regions of the three dimensional model of geometry of the part to be excluded for placing of holding tabs,
wherein the instructions to generate the set of holding tabs comprises instructions configured to cause the data processing apparatus to exclude the one or more regions at the three dimensional model from regions of the part available for connection to holding tabs.

16. A non-transitory computer-readable medium encoding instructions operable to cause data processing apparatus to perform operations comprising:
obtaining a toolpath specification for a three dimensional model of geometry of a part to be machined by a computer-controlled manufacturing system from a workpiece;
calculating predicted cutting forces to be applied to the workpiece when machining the part using the toolpath specification;
generating a set of holding tabs for the part based on the predicted cutting forces, wherein each of the holding tabs bridge from the part to the workpiece so as to keep the part fixed, in situ, within the workpiece during the machining of the part from the workpiece, and wherein at least one position of a holding tab from the set of holding tabs is determined in accordance with the predicted cutting forces; and providing the set of holding tabs for use during the machining of the part by the computer-controlled manufacturing system.

17. The non-transitory computer-readable medium of claim 16, wherein positions of the holding tabs of the set of holding tabs and a quantity of the holding tabs are determined in accordance with the predicted cutting forces and one or more directions of the predicted cutting forces.

18. The non-transitory computer-readable medium of claim 16, wherein generating the set of holding tabs comprise instructions operable to cause the data processing apparatus to:
   generate a plurality of sets of holding tabs defining different holding tab options to keep the part fixed, in situ, within the workpiece during the machining of the part.

19. The non-transitory computer-readable medium of claim 18, wherein the operations comprise:
   receiving a user selection of one of the different holding tab options from the plurality of sets of holding tabs, and
   wherein providing the set of holding tabs for use during the machining of the part comprises providing the selected one of the different holding tab options as the set of holding tabs to be used when performing the machining of the part.

20. The non-transitory computer-readable medium of claim 18, wherein the operations comprise:
   receiving input comprising a selection of one or more regions of the three dimensional model of geometry of the part to be excluded for placing of holding tabs,
   wherein generating the set of holding tabs comprises excluding the one or more regions at the three dimensional model from regions of the part available for connection to holding tabs.

* * * * *